United States Patent
Ryziuk et al.

(10) Patent No.: US 6,299,009 B1
(45) Date of Patent: Oct. 9, 2001

(54) COLLAPSIBLE FREIGHT CONTAINER FOR AIR TRANSPORT

(75) Inventors: Eugen Ryziuk, Singen; Ulf Hartmann, Hilzingen; Dieter Kiesewetter, Radolfzell; Heinz-Peter Ludwig, Engen, all of (DE)

(73) Assignee: Alusuisse Technology & Management Ltd., Rheinfall (CH)

( * ) Notice: Subject to any disclaimer, the term of this patent is extended or adjusted under 35 U.S.C. 154(b) by 0 days.

(21) Appl. No.: 09/593,085

(22) Filed: Jun. 13, 2000

(30) Foreign Application Priority Data

Jun. 18, 1999 (EP) .................................................. 99810542

(51) Int. Cl.$^7$ ........................................................ B65D 6/00
(52) U.S. Cl. .............................. 220/1.5; 220/4.29; 220/6; 220/9.2
(58) Field of Search ................................. 220/1.5, 6, 9.2, 220/9.3, 4.29, 4.28

(56) References Cited

U.S. PATENT DOCUMENTS

| 3,618,803 | * | 11/1971 | Dobberkau et al. ................... 220/6 X |
| 3,645,596 | * | 2/1972 | Russell-French .................. 220/1.5 X |
| 4,212,406 |   | 7/1980 | Mittelmann . |
| 5,242,070 |   | 9/1993 | Bretschneider et al. . |
| 5,890,612 | * | 4/1999 | Coppi ..................... 220/6 X |
| 5,941,405 | * | 8/1999 | Scales et al. ............ 220/6 X |

FOREIGN PATENT DOCUMENTS

| 2834175 | 2/1980 | (DE) . |
| 29801244 | 6/1998 | (DE) . |
| 0533626 | 3/1993 | (EP) . |
| 0822152 | 2/1998 | (EP) . |
| 0832825 | 4/1998 | (EP) . |
| 2094272 | 9/1982 | (GB) . |

\* cited by examiner

Primary Examiner—Steven Pollard
(74) Attorney, Agent, or Firm—Bachman & LaPointe, P.C.

(57) ABSTRACT

Collapsible freight container for air transport, having on a base element (8) a frame-type structure containing
a) a front frame (2) featuring an opening (22) for loading,
b) a rear frame (3) which lies opposite and parallel to the front frame (2),
c) an inner side frame (4) and at least one outer side frame,
d) and a roof frame (7) which lies opposite and parallel to the base element (8).

In the unfolded, operational state the freight container (1a) has a stable shape and is self-supporting. The rear and front frames (3, 2) are joined, via hinge-type connections (12) with horizontal axes of rotation, at the lower longitudinal sides to the abutting longitudinal sides of the base element (8) in a manner that allows them to be rotated and, are joined via hinge-type connections (11) with horizontal axes of rotation, at the upper longitudinal sides to the abutting longitudinal sides of the roof frame (7) in a manner that allows them to be rotated and, the side frames (4, 5, 6) are joined, via hinge-type connections (11) in a manner that allows them to be rotated, at one of their longitudinal sides to the longitudinal side of one of the abutting frames or the base element (8), the hinge-type connections (11) being arranged such that the side frames (4, 5, 6) can be tilted out of their operational positions.

13 Claims, 8 Drawing Sheets

COLLAPSIBLE FREIGHT CONTAINER FOR AIR TRANSPORT

BACKGROUND OF THE INVENTION

The invention relates to a collapsible freight container for air transport. Also within the scope of the invention is a process for its manufacture and a method for folding down a freight container according to the invention.

Air-freight containers, for simplicity designated in the following simply as freight container, are necessary for the storage and transportation of freight such as fragile goods and perish-able goods, suitcases etc.

Because of the limited space available for freight in the aircraft the shape of the freight container is often designed to make best possible use of that available space, that is, such that the inner wall of the round aircraft fuselage is taken into account. This way the available loading space can be used very efficiently. For that reason freight containers are often not cube-shaped.

The storage area for empty freight containers in airports is limited. Consequently empty freight containers produce problems concerning their storage in airports. For cost reasons the airline companies do not wish to have large quantities of freight containers stationed world wide. This means, however, that numerous empty freight containers have to be transported between the various airports.

For example it is not always possible onboard an outward flight, to carry sufficient freight containers for use on the return flight. As a result airlines lose out on turnover if they do not have sufficient numbers of freight containers at the airports in question. The same applies if not all of the freight containers carried on the outward flight can be used on the return flight. The fuselages of the various different aircraft are often different in shape or dimen-sions, for which reason not all aircraft are suitable for the return transport of empty freight con-tainers of a particular size and dimension.

Further, in particular when they are very busy, the airlines require an above average number of freight containers. At peak times the airlines must therefore have a corresponding large number of empty containers in store, or they must purchase or lease additional containers at short notice.

Up to now the above mentioned problems have been solved by using one-way containers or freight palettes with only nets to secure the load in place.

The possibility of folding or collapsing freight containers, to reduce the space required to only a fraction of that occupied when in use, overcomes the above mentioned disadvantages. This means that a large number of empty, collapsed freight containers can be housed in little space both for the transportation and for storage purposes.

As already mentioned, freight containers for aircraft are often not cubic in shape, but instead take into account the shape of the freight space inside the fuselage, it is therefore necessary to develop special folding methods.

A common type of freight container of the above mentioned kind is described e.g. in EP 0 313 601. That freight container is a body delimited by straight faces. It comprises a base panel with support frame mounted thereon containing vertical side sections and horizontal roof sections, whereby on one side, the side sections towards the base are inclined into the interior of the container and delimit an inclined lower wall area. In the case of this generally known version one also speaks of a container balcony on the freight container. DE 28 34 175 also describes a freight container with a similar structure.

Because of the above mentioned complicated wall structures, most known foldable freight containers that feature such a balcony are labor intensive and complicated to dismantle and build up again, and often require several helpers to hold and build them up or collapse them. Further, the available foldable freight containers are often constructed on the principle of dismantling into several individual parts and/or separation of frame-sections and elements for the frame or cladding. Furthermore, the foldable freight containers available up to now cannot be reduced to a minimum residual height which is significantly smaller than the length of the projection or vertical height of the side sections inclined inwards towards the base without the container being dismantled into individual parts or areas of frame with a common wall side and common normals being segmented by hinges.

Document EP 0 822 152 describes a collapsible freight container which can be folded together like a accordion on two facing sides each of which is divided into three frames. Hydraulic damping elements ensure that the collapsing of the container takes place in a con-tinuous manner. In that publication certain cladding elements enclosed in frames are freed from the structural frame and laid together separately. This solution suffers from the great disadvantage that the freight container can be folded down only to an overall height which corresponds to the vertical height of the inclined section at the side running towards the base; this means that the container can be folded down at most to a height of 25–30% of its operational height and still takes up a lot of space.

Further the principle of folding, that is the separate fold down of certain wall elements, is complicated and the hydraulic damping elements are intensive in maintenance.

Accordingly, it is the object of the present invention to provide a collapsible freight container for air transport which can be collapsed within a short space of time with little manipulation and with little or no tools or aids and can likewise be rebuilt with little manipulation and with little or no tools or aids, whereby the container does not have to be separated into individual parts on collapsing it.

SUMMARY OF THE INVENTION

The foregoing object is achieved by way of the invention wherein a frame-type structure is provided on a base element and comprises a) a front frame preferably featuring an opening for loading,
b) a rear frame which preferably lies opposite and parallel to the front frame,
c) an inner side frame and at least one outer side frame, and
d) a roof frame which preferably lies opposite and parallel to the base element, and in the unfolded, operational state the freight container has a stable shape and is self-supporting, and the rear and front frames are joined, via hinge-type connections with horizontal axes of rotation, at the lower longitudinal sides to the abutting longitudinal sides of the base element in a manner that allows them to be rotated and, are joined via hinge-type connections with horizontal axes of rotation, at the upper longitudinal sides to the abutting longitudinal sides of the roof frame in a manner that allows them to be rotated and, the side frames are joined, via hinge-type connections in a manner that allows them to be rotated, at one of their longitudinal sides to the longitudinal side of one of the abutting frames or the base element, the hinge-type connections being arranged such that the side frames can be tilted out of their operational positions.

On its outer side the freight container preferably contains an outer upper and outer lower side frame, whereby the longitudinal side of the outer lower side frame running towards the base is inclined to the interior of the container and the front and rear side frames delimit a container balcony in the part of the frame pointing towards the outer side.

The freight container according to the invention is preferably a structure made up of individual frames. Mounted on the long sides of a preferably rectangular, flat and slab-shaped base element are preferably three vertical frames which may be set onto the base or mounted to the sides thereof. These frames comprise a front and rear frame and an inner side frame. Mounted on a fourth long side is a lower outer side frame, which is preferably inclined outward and follows the contours of the front and rear frames, onto the long side towards the roof is usefully an upper outer side frame running essentially in the vertical direction. A roof frame of the same kind of construction connects up with the upper long sides of the front and rear frames and with the inner and upper outer side frame.

By the outer side is to be understood the container side and if present balcony-like side of the container facing the freight space or inner wall of the aircraft, while by the inner side is to be understood the side of the container facing the interior of the freight space.

Usefully the frames contain sections which are fitted together via gusset or connecting elements, in particular gusset plates or connecting sheets, by riveting, bolting or welding. Non-nodal joining methods may also be used as connecting means for the frame. By frame sections here is to be understood all versions of elongated structural elements from which a frame may be constructed. The long sides of the frames are preferably delimited by frame sections.

The frame sections are usefully sections of ferrous metals such as iron, zinc coated iron, steel, non-ferrous metals such as brass, copper, magnesium and its alloys, aluminium and its alloys and preferably hollow sections produced by an extrusion process, such as simple hollow sections of aluminium or its alloys. Further, the sections may contain struts, ribs or flanges and recesses or openings, e.g. to accommodate hinge parts.

The gusset sheets or connecting sheets are usefully of ferrous metals such as iron, zinc coated iron, steel, non-ferrous metals such as brass, copper, magnesium and its alloys, and preferably aluminium and its alloys.

Further, the frame sections and the gusset or connecting sheets may be of plastics, usefully of reinforced plastics, in particular fibre-reinforced plastics, preferably carbon or glass-reinforced plastics, out of composite materials, in particular metal-plastic composite materials.

The outer side of the freight container according to the invention, along with the outer lower and upper side frames, preferably forms together with the front and rear frame the contour of a so-called container balcony: An outer lower side frame lies inclined against the long side of the base element in such a manner that the base element and the outer lower side frame together form an obtuse angle. Bordering on to the horizontal section at the top of the outer lower side frame is an outer upper side frame which runs vertically, the top horizontal section or long side of which borders on to the roof frame.

With the exception of the front and rear frames, all frames are preferably rectangular in shape. The front and rear frames are basically also rectangular structures with at least one horizontal section at the top and two vertical sections, inner and outer sections, a distance apart. A horizontal top section extends preferably sideways beyond an additional, central vertical section. Connecting up with the outer end of the top section is the outer section which, however, ends a certain distance above the base element. Bordering on to the end of that vertical central section is an outer inclined section which is inclined with respect to the vertical central section.

The roof frame the rear frame and the side frames or areas thereof are preferably covered or filled in with wall cladding. An door opening for loading and unloading the container is provided preferably in a front side frame. The area of the front frame forming the container balcony which is bounded by the central section on the door opening side is likewise covered or filled in with wall cladding.

The door in the front frame is a flexible door which may be rolled up in the vertical direction or swung out, and is attached e.g. at the top end by a hollow channel in the section at the top of the front frame, and at the bottom end is attached at the side by means of locking devices or by means of belts attached horizontally to the vertical sections of the front frame at the side of the door. It may, however, also be one or more rigid or semi-rigid plate-like elements which are connected via moveable hinges.

The wall cladding comprises a metal sheet of panels of steel or zinc coated iron, preferably however of aluminium or its alloys. The panels are mounted on section struts, which are usefully arranged on the inner side of the frame sections, for example by means of rivets, in particular tensile shear rivets, of aluminium. The wall cladding may also be of flexible materials, in particular textile weaves or of plastic elements, in particular fibre- reinforced plastic elements or composite materials, in particular metal-plastic composites.

The individual frames are preferably prefabricated, fitted with wall cladding and finally fitted together along with the base element to form a container structure which is stable in shape and self-supporting.

The inner side frames and the rear frame are usefully joined together at their abutting vertical sections or long sides in a manner allowing rotation by means of hinge-type connections, preferably a strap hinge with vertical axis of rotation. The hinge-type connections are conceived and attached such that the inner side frame can be tilted about the hinge axis counter-clockwise, as viewed from the roof frame, onto the outer face of the rear frame and comes to rest there with its outward face.

Feasible hinge-type connections are, apart from hinges, also ball joints. Further, the hinge-type connections may also contain bearings of various kinds. The hinge-type connections, in particular hinges, are preferably of metal such as steel, iron, aluminium, brass or alloys thereof and preferably of zinc coated iron. If strap hinges are employed, then these may extend partially or wholly over the length of the frame sections or long sides.

The inner side frame and the front frame are connected rigidly together at their abutting vertical sections or long sides, usefully by means of a releasable connection. They are preferably joined together via one or more, in particular however via two interlocking devices, preferably locking devices in the form of snap-shut closures.

The outer lower side frame is attached rigidly at its lower part to the base element and/or the side-contacting rear frame and/or front frame, usefully by means of a releasable connection. This is preferably joined rigidly at its horizontal bottom frame section to the side-contacting rear and/or front frame by means of one or two interlocking devices, preferably locking devices in the form of snap-shut closures.

Further, the outer lower side frame is joined at its horizontal top section or long side to the horizontal bottom section or long side of the outer upper side frame in a manner allowing rotation, this by means of a hinge-type connection, preferably a strap hinge with horizontal axis of rotation.

The outer upper side frame is joined at its bottom part to the side-contacting rear and/or front frame, usefully by means of a releasable rigid connection. This is attached at its bottom horizontal section to the side-contacting rear and/or front frame, preferably by means of locking devices in the form of snap-shut closures. In another version the same connection or locking device may be mounted in the upper part of the outer lower frame, preferably in its top horizontal section.

The outer upper side frame is joined at its top horizontal section or long side to the side-contacting outer section or long side of the roof frame in a manner allowing rotation, this by means of a hinge-type connection, preferably a strap hinge with horizontal axis of rotation.

The hinge-type connections are arranged and attached such that in the unlocked state the outer lower side frame can be tilted from its inclined position into the plane of the outer upper frame, and that the outer upper and outer lower side frames can be tilted together about the hinge-type connection at the top onto the roof frame. As a rule, after opening the locking device, the bottom section or long side of the outer lower frame, or a fitment attached there, touches the ground and can be tilted further only after releasing and tilting the outer upper frame.

The rear and front frames are attached at their lower frame ends or horizontal bottom sections or long sides to the base element, usefully by means of a hinge-type connection with horizontal axis of rotation. Preferably at least two hinges attached at the edge to the frame and base element are employed as the hinge-type connection.

Usefully the front frame features no horizontal section at the bottom. Usefully the hinge-type connection is comprised of two hinges. One wing of the hinge is attached to the base element and the second wing of the hinge is attached to a longitudinal connecting element, in particular connecting sheet, whereby the connecting element is attached rigidly to the vertical central section or to the inner vertical section of the front frame.

Towards the roof the rear and front frames are joined at their horizontal top sections or top long sides to horizontal to the abutting rear or front frame section or corresponding long side of the roof frame in a manner allowing rotation, this by means of hinge-type connections with horizontal axes of rotation. The hinge-type connections employed for this purpose are preferably strap hinges extending partly or wholly over the whole length of the sections.

The hinge-type connections between the base element and the rear and front frames and between the roof frame and the rear and front frames are such and are arranged on the frame structure or frame sections such that, after folding the side frames, the container construction can be folded down in a parallelogram-like manner, horizontally from the rear side in the direction of the front frame, and vertically from the roof side in the direction of the base element.

The door opening in the front frame can preferably be closed off by means of a flexible container door that can be rolled up from the base element to the roof frame. EP 0 533 626 describes a flexible door such as can be employed in the present invention. As door it is also possible to employ a so-called barless door, such as is described in the following example.

Usefully, on the outer lower and on the inner side frame, and on the rear frame, a covering or sealing element is provided towards the base on the bottom section or on its struts, e.g. a longitudinal sheet and/or a sealing strip, advantageously of plastic, preferably of an elastomer or polyvinylchloride (PVC). The sealing strip may be attached directly to the sections for example by adhesive bonding, or be drawn into an appropriate groove-shaped recess in the section, whereby the groove-shaped recess is preferably a hinge section with channel, attached to the frame section. The hinge section with channel is comparable with the hinge sections used to hang foldable doors. The covering or sealing element lies preferably flush with the base element and seals any gap formed between the frame and the base element.

The abutting faces of the frame sections in the operational state of the freight container may also be sealed by sealing strips, for example of plastic, which are usefully attached, for example adhesive bonded, on a face of one of the sections.

The interlocking and releasable connections or locking devices between the individual frames serve the purpose of locking the frames that have to be arrested, in particular the side frames, to prevent them from rotating in their hinge-type connections. Locking devices are particularly suitable for that purpose. These may be spring-loaded bolts, lying preferably horizontal, and situated in the end region of, preferably horizontal, sections of a first frame, in particular side frame and mounted in a support housing such that the said sprung-loaded bolts engage in a side opening in a side-contacting hollow section of a second frame, preferably standing at an angle of 90° to the horizontal frame section, and thereby lock the first frame in place. The locking action takes place preferably at the outer region of a long side.

When the spring is in the non-tensed state, the closure bolt is preferably in the locking position. The opening of the locking device is performed usefully via an actuating element attached to the closure bolt by a welded joint; this may be in the form of a pin, lever, ring or side-bar. The actuating element may also be a part of the closure bolt.

To open the closure bolt or bolts, these are pushed back out of the opening into an open position, in which process the spring is loaded. The side frame in question can then be tilted. By releasing the spring, the closure bolt can be snapped back into the locking position pro-viding the desired locking action. Such a closure is also called a snap-shut closure.

It can be arranged for the closure bolt to be engaged in a fixed position when it is pushed into the open position, whereby the closure bolt can, by repeated operation of the actuating element, be moved from the open position and into the locking position.

The actuating element may be designed in such a manner that its manipulation is performed by hand or with the aid of a tool. The actuating element may either project through an opening and beyond the section, or it may be completely recessed in the frame section, so that it can be manipulated ideally with the aid of tool via an opening provided in the frame section. The last mentioned version has the advantage that no parts project beyond the section—which could disturb or be damaged on collapsing the freight container. The locking device, that is, the actuating element is preferably arranged such that the closure mechanism can be actuated only from inside the container. This prevents unauthorised persons from evading the door lock and being able to open or collapse a closed freight container.

The locking device may also function according to the principle described in EP 0 533 626, whereby preferably all locking devices including the actuating element are housed in the hollow frame section.

The freight container according to the invention preferably contains at most six locking points, each of which are usefully arranged facing in pairs, and which have to be actuated i.e. opened for collapsing and building up the freight container. The locking of the door is not included in this.

The base element may, laid out either for transportation with a trolley as base element or as base element for transportation with a fork-lift truck, in both cases without impairing the folding characteristic of the freight container. In the latter case the base element features pockets or channels intended for the lifting forks of the fork-lift truck.

The collapsing of the freight container is performed by opening the locking devices joining the inner side frame to the front frame and swinging the inner side frame about the hinge-type connection connecting the inner side frame to the rear frame and laying the inner side frame on the rear frame in such a manner that the outer lying sides of the rear frame and that of the inner side frame lie against each other.

Next, the locking devices on both outer side frames are opened so that the two side frames are no longer arrested at the side to the rear and/or front frame or base element. The outer lower frame swings about the hinge-type connection on its top frame section into the plane of the outer upper frame. The outer lower and upper side frames are swung together about the hinge-type connection at the roof and laid on the roof frame such that the two outer side frames come to rest with their outer faces on the outer face of the roof frame.

As the front and rear frames, along with the roof frame and the base element are joined, as described above via hinge-type connections, the freight container can now be folded down in a last step from the rear side in the direction of the front frame and from the roof side in the direction of the base element in a parallelogram-like manner.

As an open and rolled up or tilted folding door is attached to the top section of the front frame, the rolled up door lies on an outer side of the collapsed container.

The freight container for air transport according to the invention may exhibit the normal, conventional measurements and dimensions for freight containers. The freight container, however, preferably exhibits measurements and dimensions that allow it to be folded onto a base area of 88"×125" which is normal for a standard airfreight palette (corresponds approximately to: 2.2 m×3.2 m). this means that several collapsed freight containers can be stacked and transported on a standard airfreight palette.

The product according to the invention can be manufactured by fitting together into frames prefabricated cut-to-size frame sections, preferably extruded simple hollow sections of aluminium using corner connections, preferably connection sheets and, with the exception of the door opening, mounting wall cladding, preferably of aluminium sheet, into the frames i.e. onto the frame sections, preferably onto the struts on the sections, attaching the wall cladding there preferably using rivets, in particular tensile shear rivets, and fitting the frames at their sections with the aid of hinge-type connections and/or locking devices together with the base element to form a freight container that is stable in shape, self-supporting and can be folded down.

The freight container is preferably secured at its inner and/or outer side(s) between the rear frame and/or the roof frame and the front frame via one or more reinforcements on frame sections in such a manner that, after folding over the side frames, the freight container is secure from a force acting from the front in the direction of the rear frame, but can be collapsed from the rear frame in the direction of the front frame. The reinforcements also serve to provide general stability of the container when in the operational state.

Preferred are cable-like reinforcements. Particularly useful are steel cables e.g. 3–7 mm thick. In the fully assembled, operational state the cable-like reinforcements are preferably under tension.

A reinforcement, preferably in the form of a steel cable, is provided on the inside between the roof frame and the front frame. The reinforcement is preferably attached to the inner frame section of the roof frame a distance from the rear frame of $\frac{1}{6}$ to $\frac{1}{2}$, preferably around $\frac{1}{3}$ of the overall length of the section, and is attached to the inner frame section of the front frame a distance from the base element of $\frac{1}{6}$ to $\frac{1}{2}$, preferably around $\frac{1}{3}$ of the overall length of the section.

A further reinforcement, preferably in the form of a steel cable, may be provided on the outer side between the rear frame and the front frame. The reinforcement is preferably attached to the outer frame section of the rear frame, and to the outer frame section of the front frame almost horizontal or slightly inclined.

The freight container according to the invention is amongst other things, with respect to shape, size, material properties, conditions for air freight technical approval and handling, comparable with conventional standard containers.

The advantages of the present invention are that the freight container can be collapsed to a minimum total height and area, without having to completely separate individual elements or components from the container structure. The maximum overall height of the collapsed freight container amounts to no more than the sum of the heights of the inner and outer side frames and the rear frame.

As the freight container according to the invention, excepting the door locks, feature only six locking points, the freight container can be collapsed and built up in a short time employing only two persons, in some cases also by only one person, and with extremely little effort. The folding principle is very simple, for which reason the user does not require extensive instruct-ion. The freight container according to the invention is with respect to strength, stability, quality, service life, need of maintenance and ease of repair, equivalent to known standard containers.

BRIEF DESCRIPTION OF THE DRAWINGS

In the following the invention is described in greater detail with the aid of an example and with reference to the attached drawings which show:

FIG. 2b: a cross-section through the inner side frame along D—D in the region of the front frame as shown in FIG. 2a;

FIG. 2c: a cross-section through the inner side frame along D—D in the region of the rear frame as shown in FIG. 2a;

FIG. 3b: a cross-section through the rear side frame along A—A in the region of the roof hinge as shown in FIG. 3a;

FIG. 3c: a cross-section through the rear side frame along A—A in the region of the base hinge as shown in FIG. 3a;

FIG. 4b: a cross-section through the outer side frames along B—B in the region of the roof hinge as shown in FIG. 4a;

FIG. 4c: a cross-section through the outer side frames along B—B in the region of the connection between the outer upper and outer lower side frames as shown in FIG. 4a;

FIG. 4d: a cross-section through the outer side frames along B—B in the region of the base element as shown in FIG. 4a;

FIG. 5b: a cross-section through the front frame along C—C in the region of the roof hinge as shown in FIG. 5a;

FIG. 5c: a cross-section through the front frame along C—C in the region of the base hinge as shown in FIG. 5a;

FIG. 7a: cross-section through a snap-shut closure in the closed state, along line E—E as shown in FIG. 2a, and FIG. 7b: a plan view of a snap-shut closure viewed in the direction Z as shown in FIG. 7a.

DETAILED DESCRIPTION OF THE PREFERRED EMBODIMENT(S)

Figure 1:
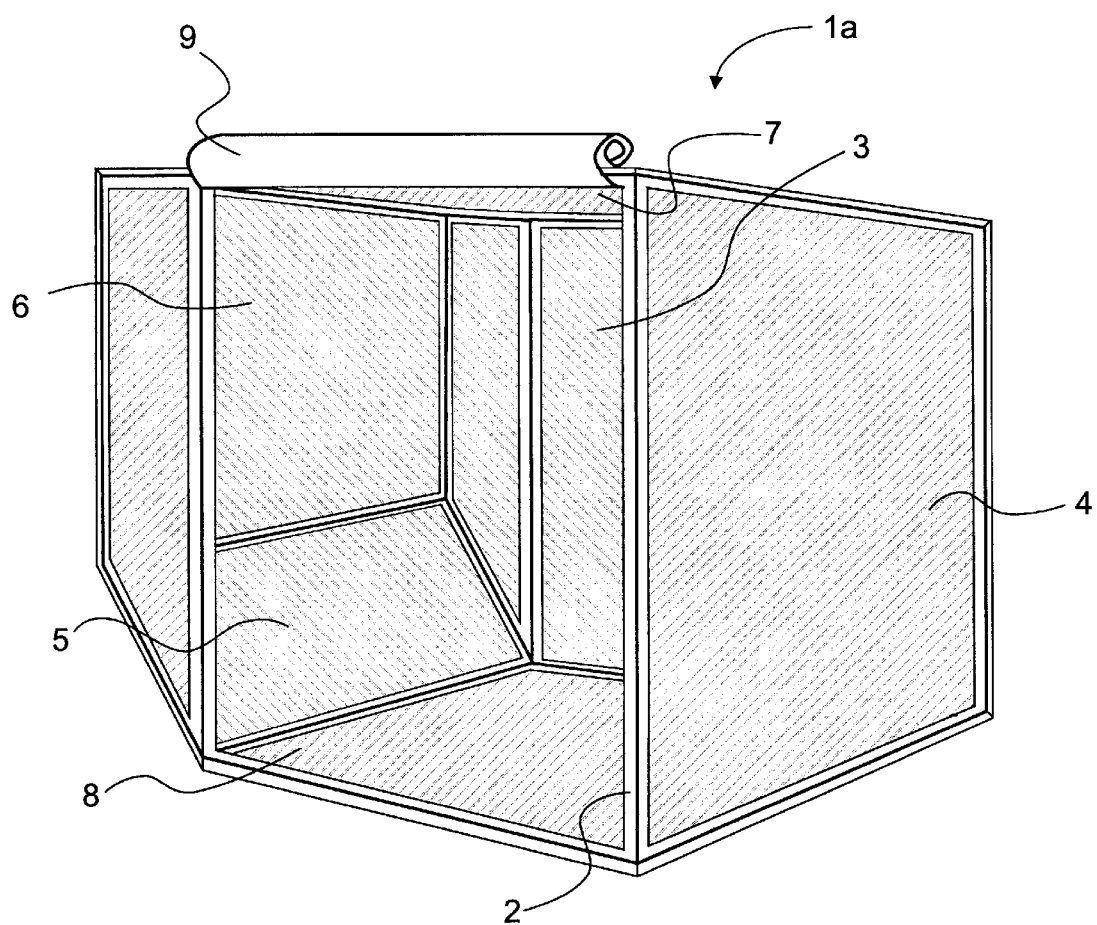
FIG. 1: a schematic perspective view of a freight container.

The freight container is illustrated in FIG. 1 as an unfolded freight container la ready for use. The frames are in the so-called operational position. The illustration is only schematic and is intended simply to reveal the positions of the individual frames. The freight container contains a base element 8 and arranged thereon a frame-type structure containing a front frame 2, a rear frame 3, an inner side-frame 4, an outer lower and outer upper side-frame 5, 6, and a roof frame 7. The front frame 2 contains an opening which can be closed off by a flexible door 9. The door 9 is mounted in the region of the roof along the horizontal front face of the frame section 25 of the front frame 2 (see also FIG. 5a). By the front face is meant in this text a side facing the viewer looking at the front elevation.

Figure 2A:
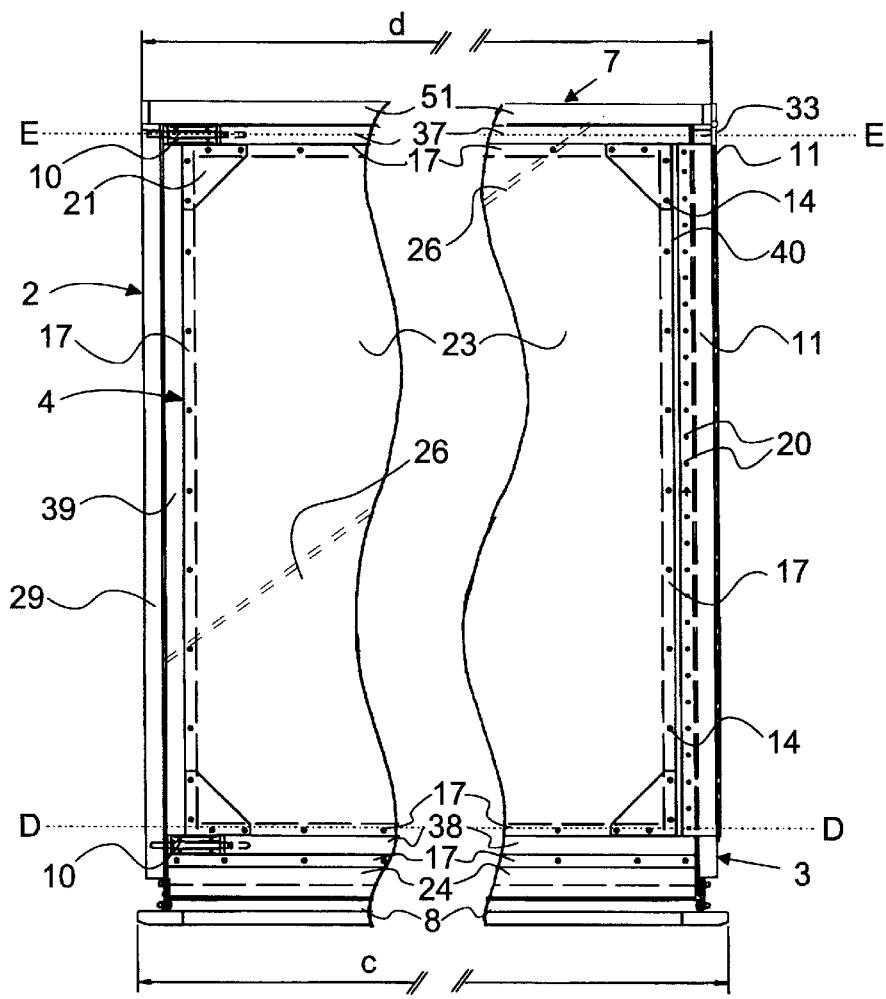
FIG. 2a: a front elevation from the outside looking at the inner side of the freight container.

The inner side frame 4 shown in FIG. 2 comprises four frame sections upper, lower, front and rear 37, 38, 39 and 40 respectively, which are riveted together via connecting sheets or fishplates 21 which are fixed on the struts of the mentioned sections, using tensile shear rivets 14.

The side frame 4 is filled-in with a wall cladding 23 of aluminium sheet which is attached to the inner lying strut 17 by means of tensile shear rivets 14. Mounted in the horizontal frame sections at the top 37 and at the bottom 38 are snap-shut type closures 10 situated at the edges on the side of the frame lying against the front frame 2. For clarity, these have been made visible in FIG. 2a.

Figure 2B:
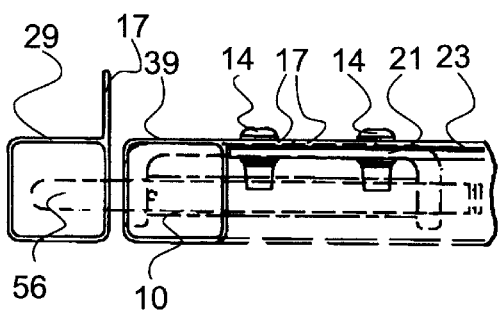
Figure 2C:
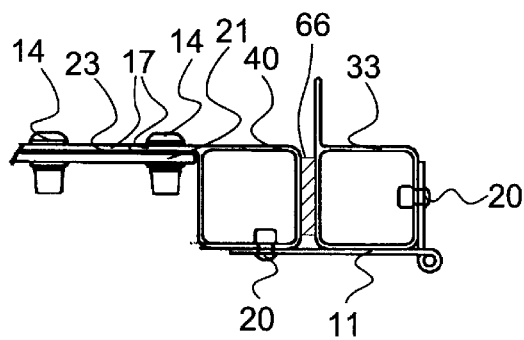

In the locking position, the bolts 56 of the snap-shut type closures 10 engage in the openings in the abutting inner section 29 of the front frame 2 (see also FIG. 2b).

The outward facing front section faces of the frame sections 37, 38, 39, 40 of the inner frame 4 lie in the same plane as the front section faces of the inner sections 51, 29, 33 of the roof frame 7, the front frame 2 and the rear frame 3.

Towards the base a longitudinal sheet 24 is provided on the outer section strut 17 of the bottom section 38 of the inner side frame 4, which extends to the shoulder of the base element 8. One wing of a strap hinge 11 is attached by means of rivets 20 to the front side of vertical rear section 40 of the inner frame 4. The second wing of the strap hinge 11 is attached to the front side of the vertical inner section 33 of the rear frame 3 (see also FIG. 3a)—also by means of rivets 20 (see also FIG. 2c). Between the two frame sections 33, 40 lies a sealing element 66.

On releasing the snap-shut closures 10, the inner side frame 4 can be tilted about the axis of the hinge and laid onto the rear frame 3.

The freight container is preferably secured at its inner face between the roof frame 7 and the front frame 2 via a reinforcement—in this version a cable 26 (shown schematically in FIG. 2a)—attached to the inner frame sections 29, 51, in such a manner that after folding the side frames 4, 5, 6, the freight container does not move from the front in the direction of the rear frame 3, but can be folded from the rear in the direction of the front frame 2. The cable 26 is approx. 5 mm thick and is preferably attached to the struts 17 on the frame sections 29, 51. In the fully assembled, operational state the cable 26 is preferably under tension.

The cable 26 is attached to the inner section 51 of the roof frame 7 a distance of approx. ⅓ of the overall length of the section from the rear frame 3, and to the inner section 29 of the front frame 2 a distance of approx. ⅓ of the overall length of the section from the base element 8. Rivets, in particular tensile shear rivets or bolts are employed for this purpose.

Figure 3A:
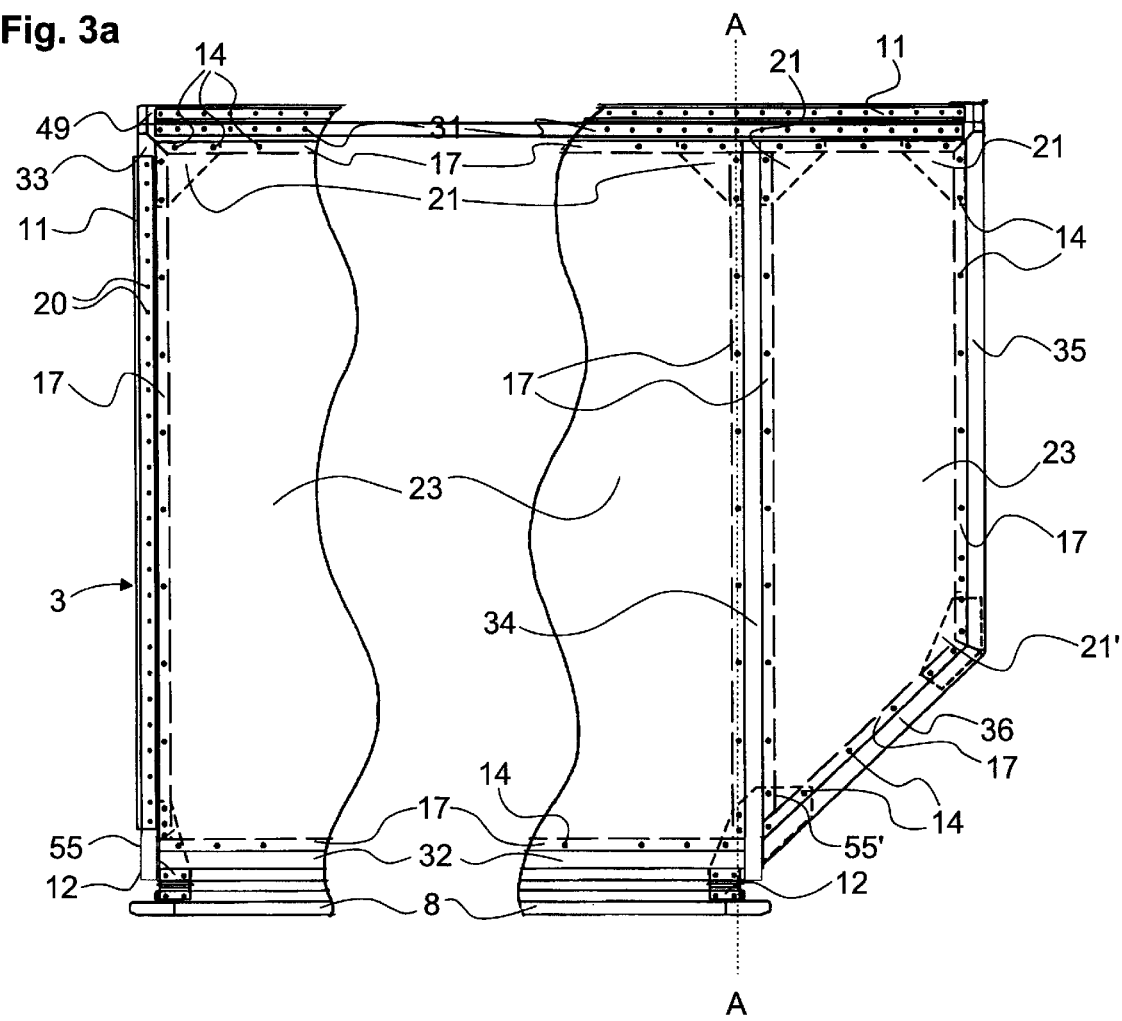
FIG. 3a: a front elevation from outside looking at the rear side of the freight container.

The rear frame 3 shown in FIG. 3a is comprised of top, bottom, inner, central, outer and inclined frame sections 31, 32, 33, 34, 35, 36 that are fitted together via connecting sheets 21, 21', 55, 55' which are attached by means of tensile shear rivets to the section struts 17. The frame 3 is filled out with wall cladding 23 panels that are made of aluminium and are attached to the inner struts 17 by means of tensile shear rivets 14. Hinges 12 are mounted by means of tensile shear rivets 14 to the outer lying strut 17 of the horizontal bottom section 32. The rivet connections 14 also pass through the abutting connecting sheet 55 (see also FIG. 3c) resting against the inside of the frame section 32. The other wing of the hinges 12 are affixed by means of tensile shear rivets 14 to the front of a vertical strut on the base element 8.

The frame sections 34, 35, 36 and 31 form the so called container balcony.

Rear section 40 of the inner side frame 4, rear section 47 of the outer upper side frame 6, rear section 43 of the outer lower side frame 5 (not visible in FIG. 3a) and rear section 49 of the roof frame 7 border on to the corresponding frame sections 31, 33, 35 and 36.

The outward facing front faces of sections 31, 32, 33, 34, 35, 36 of the rear frame 3 lie in the same plane as face of rear section 49 of the roof frame 7.

Figure 3B:
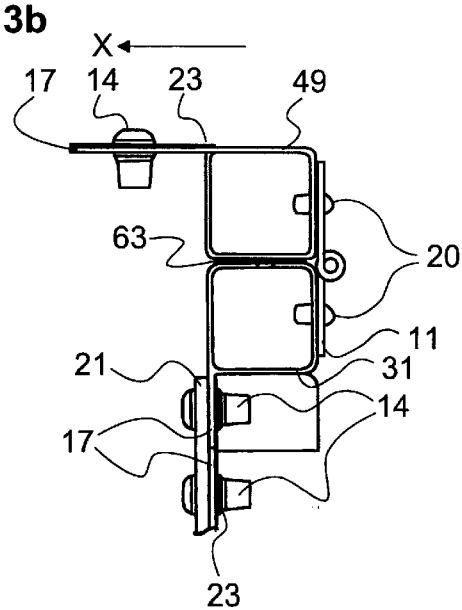

The rear frame 3 and the roof frame 7 are joined at their parallel, abutting horizontal sections 49, 31 via a strap hinge 11 attached to the sections by means of rivets 20 (see also FIG. 3b). A sealing element 63 is provided between the two sections 49, 31. Tensile shear rivets 14 penetrate strut 17 on section 31, in the process joining section 31 to the connecting sheet 21 and the wall cladding 23.

Figure 3C:
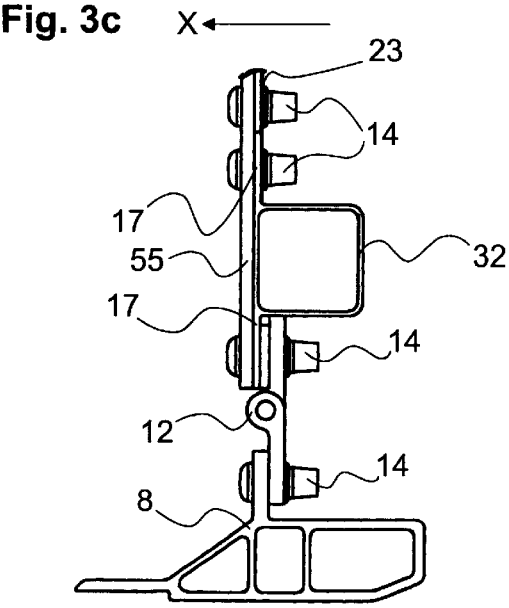

As shown in FIGS. 3a–3c, the hinges 11, 12 are mounted in such a manner that the freight container 1a' (see FIG. 6a) can be folded down in direction X like a parallelogram.

Figure 4A:
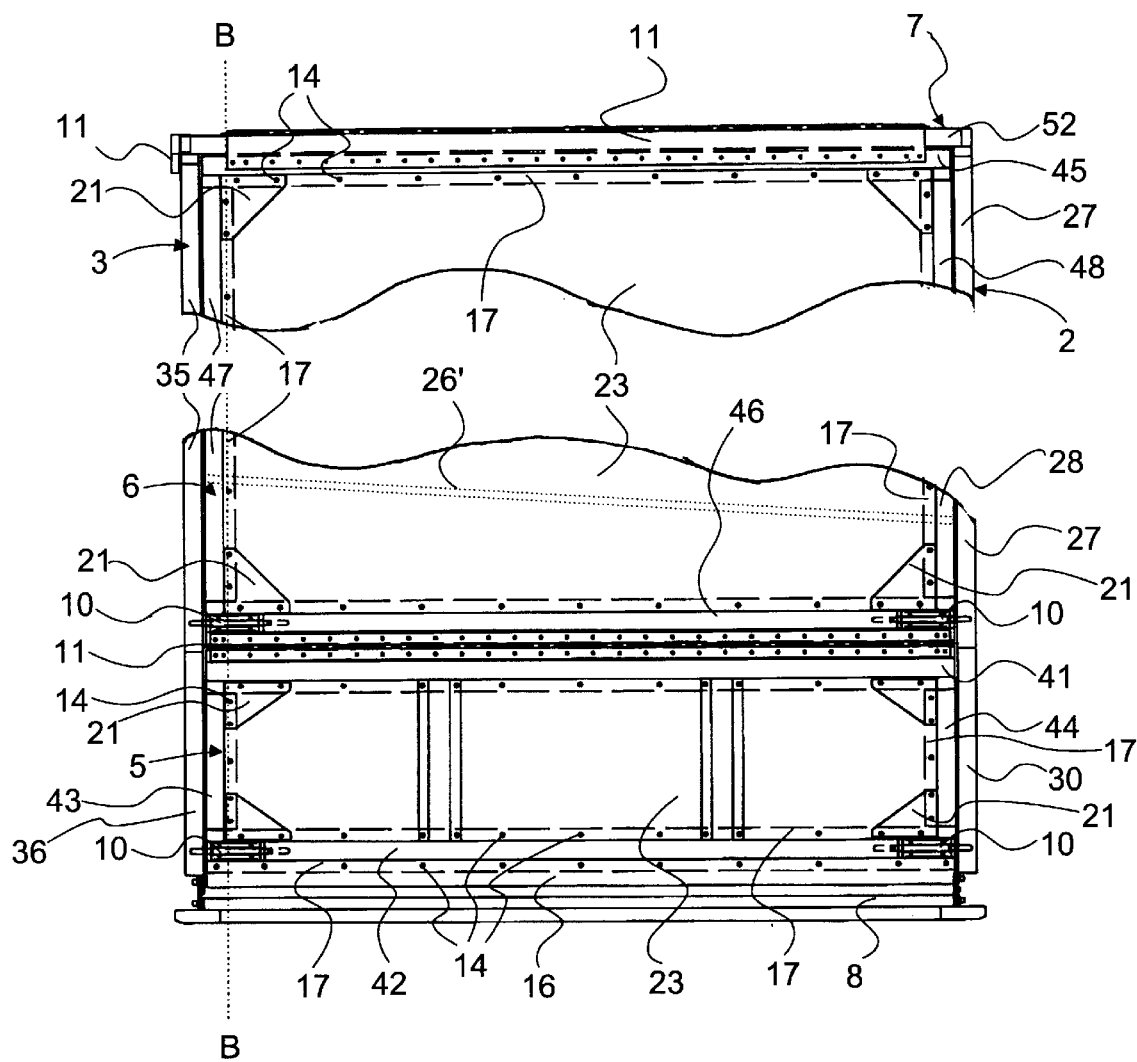
FIG. 4a: a front elevation from the outside looking at the outer side of the freight container.

The top, bottom, rear and front frame sections 41, 42, 43, 44 of the outer lower side frame 5 are joined together by means of connecting sheets 21 which are riveted to the inner strut 17 (see FIG. 4a). The outer lower side frame 5 is filled out with a wall cladding 23 of aluminium sheet which is attached to the inwards lying section struts 17 by means of tensile shear rivets (see also FIGS. 4c–4d). Snap-shut closures 10 are provided at the edge on the bottom section 42, recessed into the interior of the section. For clarity these are made visible in FIG. 4a. In the locking position, the locking bolts of the snap-shut closures 10 engage in catch-openings in the abutting inclined sections 36, 30 of the rear and front frames 3, 2. The outward facing front faces of the sections 41, 42, 43, 44 lie on the same plane as the front faces of the inclined sections 30, 36 of the front frame 2 and the rear frame 3. The lower end of an angled longitudinal sheet 16 which is attached to the strut 17 on the lower section 42 points towards the base element 8 (see also FIG. 4d).

Figure 4B:
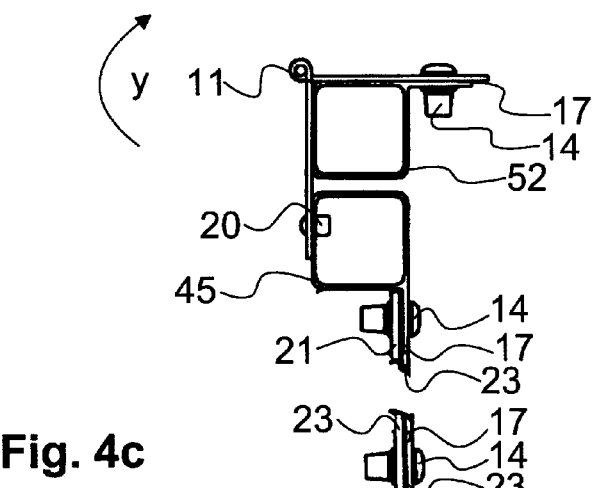
Figure 4C:
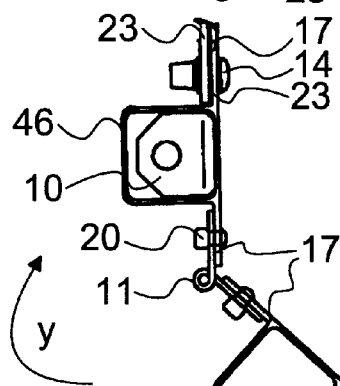

The top, bottom, rear, front sections 45, 46, 47, 48 form the outer upper side frame 6 which, analogous to the outer lower side frame 5, is joined together by means of connecting sheets 21 and is filled out with wall cladding 23 of aluminium sheet (see also FIGS. 4b–4c).

Both abutting sections 41, 46 of the outer frames 5, 6 are connected on the front side with their struts 17 facing each other by means of a strap hinge (see also FIG. 4c).

At the edge, recessed into the interior of the lower horizontal section 46 of the outer upper side frame 6 are snap-shut closures 10. For reasons of clarity these are made visible in FIG. 4a. In the locked position, the locking bolts of the snap-shut closures 10 engage in catch- openings in the abutting side sections 35, 27 of the rear and front frames 3, 2 respectively.

The connecting sheets 21', 55' next to the catch-openings extend beyond the struts 17 and cover the subsequent frame section faces, with the result that the catch-opening passes through the wall of the frame section and the corresponding connecting sheet 21' and 55'. This has the purpose of providing reinforcement in the region of the catch opening (see FIGS. 3a, 5a).

The outward facing front side faces of sections 45, 46, 47, 48 of the outer upper side frame 6 lie in the same plane as the front side faces of the outer sections 27, 35, 52, of the front frame 2, the rear frame 3 and the roof frame 7 respectively.

Between the rear frame 3 and the front frame 2 the freight container is additionally stabilised on the outer side by reinforcing means—in the version shown by a cable 26' (shown schematic-ally in FIG. 4a) attached to the outer frame sections 35, 27. The cable 26' is approximately 5 mm thick and is preferably attached to the struts 17 on the sections mentioned. When the container is in the completely operational, unfolded state, the cable 26' is under tension.

The cable 27' is attached to the frame sections, inclined slightly downwards in the direction of the front frame 2. Rivets, in particular tensile shear rivets or bolts are used for attachment purposes.

Also shown in FIG. 4b is the attachment of the strap hinge 11 to the upper horizontal section 45 of the outer side frame 6 by means of rivets 20, whereby the other wing of the strap hinge 11 rests on the abutting section 52 of the roof frame and is attached to its strut 17 by tensile shear rivets 14.

Figure 4D:
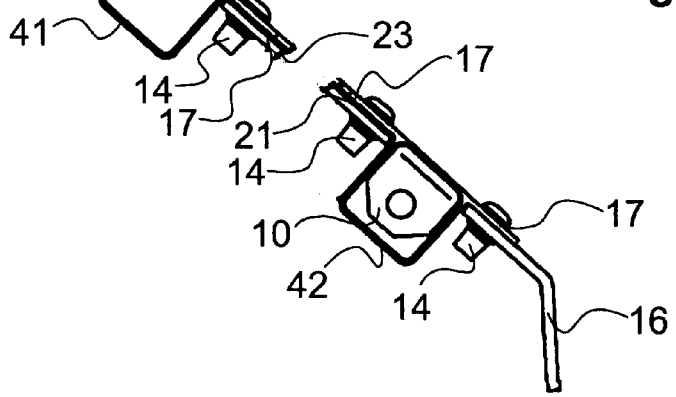
Figure 4D:
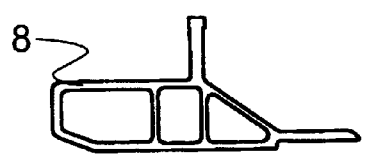

Also shown in FIG. 4d is the attachment of the angled longitudinal sheet 16 to strut 17 on section 42, this by means of tensile shear rivets 14. Likewise to be seen in FIGS. 4c and 4d are the locking devices 10 provided in sections 42 and 46.

Before collapsing the freight container 1a, the outer lower frame 5—after releasing the snap shut closure 10 at the bottom—is tilted about the central hinge 11 in direction Y from its inclined position into a free hanging position. Subsequently, after releasing the middle snap-shut closures 10, both outer side frames 5, 6 are tilted together in direction Y around the hinge 11 at the roof and laid over the roof frame 7. The hinges 11 are mounted in such a manner that the above mentioned rotational movements can be carried out without hind-rance.

The front frame 2 (FIG. 5a) contains top, outer, central, inner and inclined sections 25, 27, 28, 29, 30 which are joined together via connecting sheets 21, 21', 55, 55'. In the example shown the front frame 2 features no horizontal section at its base end. The connecting sheets 21, 21', 55, 55' are attached to the inner struts 17 of the sections to be joined, this by way of tensile shear rivets 14. The front frame 2 is joined to the base element 8 by way of hinges 12 in a manner that allows it to be rotated. As the front frame 2 does not exhibit a horizontal bottom section abutting onto the base element 8, the hinges 12 are attached by means of tensile shear rivets 14 to the connecting sheets 55, 55' (see also FIG. 5c). In the region of the roof the top, horizontal section 25, lies against the front section 50 of the roof frame 7 (see also FIG. 5b). Both sections are connected together via a riveted on strap hinge 11 to the section faces which are vertical as viewed in front elevation. The hinges 11, 12 are mounted in such a manner that the freight container 1a' (see also FIG. 6a) can be collapsed in the direction X like a parallelogram (FIGS. 5b,c).

The outward facing front faces of the sections 25, 27, 28, 29, 30 of the front frame 2 lie in the same plane as the front faces of the front section 50 of the roof frame 7.

Figure 5A:
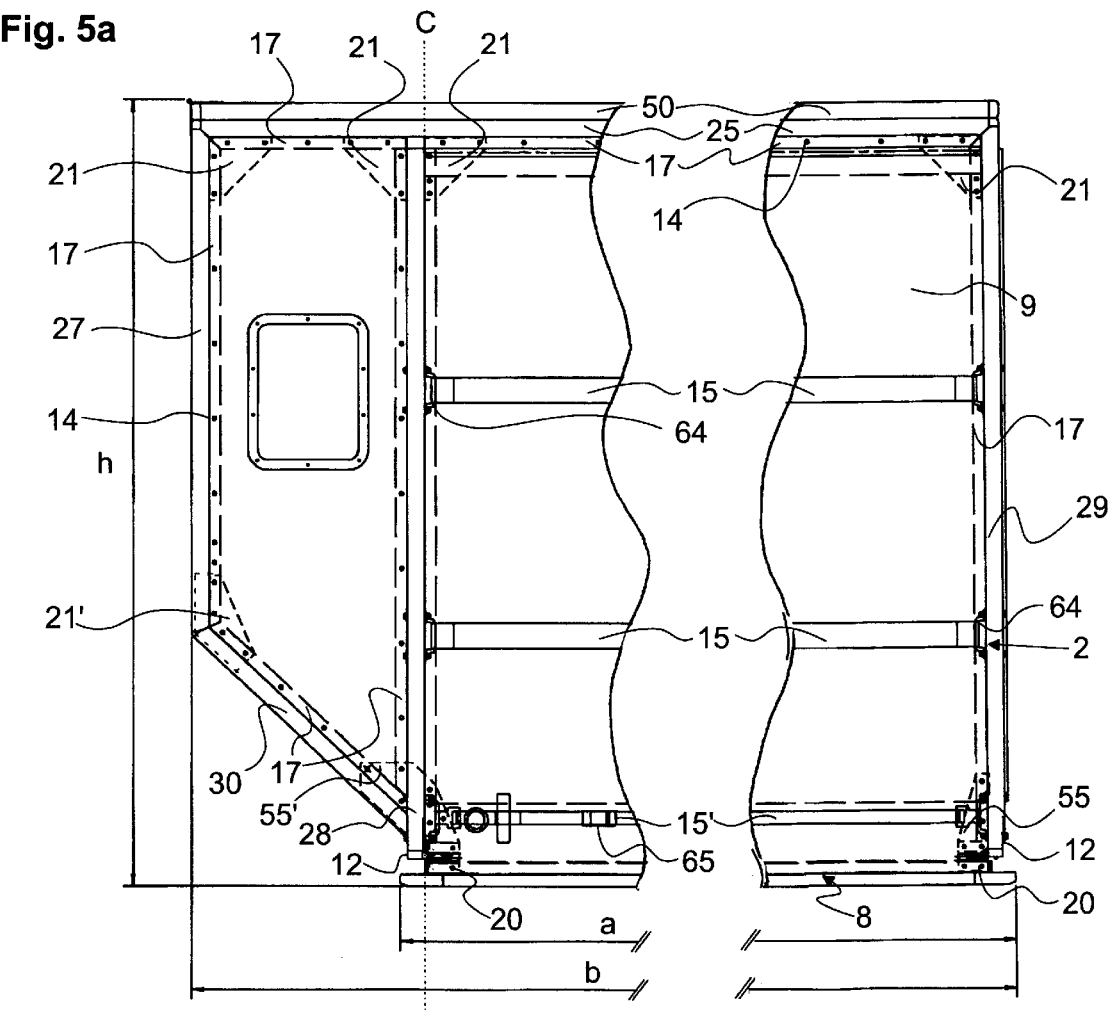
FIG. 5a: a front elevation from the outside looking at the front side of the freight container.
Figure 5B:
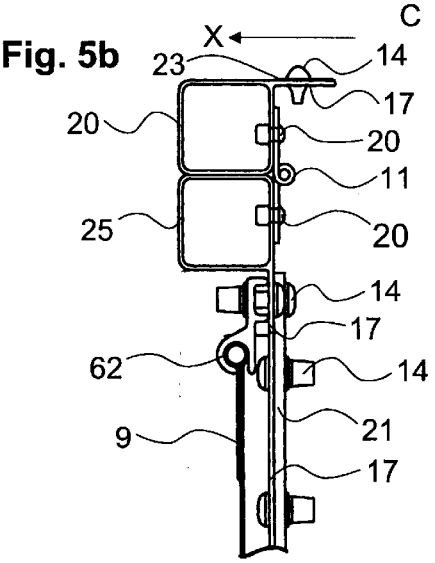
Figure 5C:
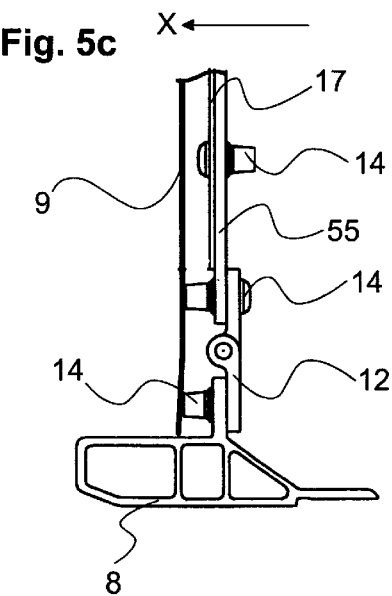

The opening for loading the freight container is fitted with a flexible door or door cover 9 with so called barless closure (FIG. 5a). Horizontal closure belts 15 are provided on the door cover 9, for example sewn on to the cover. The extensions of the closure belts 15 are drawn through loops 64 on the central and inner side sections 28, 29 of the front frame 2. By tensing the belts the door covers are drawn tight, as a result of which the lengths of the closure belts 15 passed through the loops 64 are laid back and fixed by means of hook-and eye or Velcro®-closures on the door cover 9.

The loops 64 may e.g. be U-shaped elements with attachment areas at the side or struts of metal or plastic, joined to the frame sections by means of riveting, bolting or adhesive bonding. The top end of the door cover is engaged in a channel-type groove in a hinge section 62 mounted by means of riveting to the strut 17 of the top section 25 of the front frame 2 (FIG. 5b).

The roof frame 7 (not shown in the drawings) is comprised essentially of the rear, front, inner and outer sections 49, 50, 51, 52 (see FIGS. 2 to 5), which are joined together by means of connecting sheets 21, analogous to the rest of the above mentioned frames. In contrast to the other frame structures, the struts 17 of the sections 49, 50, 51, 52 do not lie on the inside but instead on the outside (see FIG. 5b), and the wall cladding 23 is attached to the outer lying face of the strut 17. This different arrangement of the struts 17 on the roof frame 7 is a result of the positioning of the hinge 11, as shown in FIG. 5b.

Figure 6A:
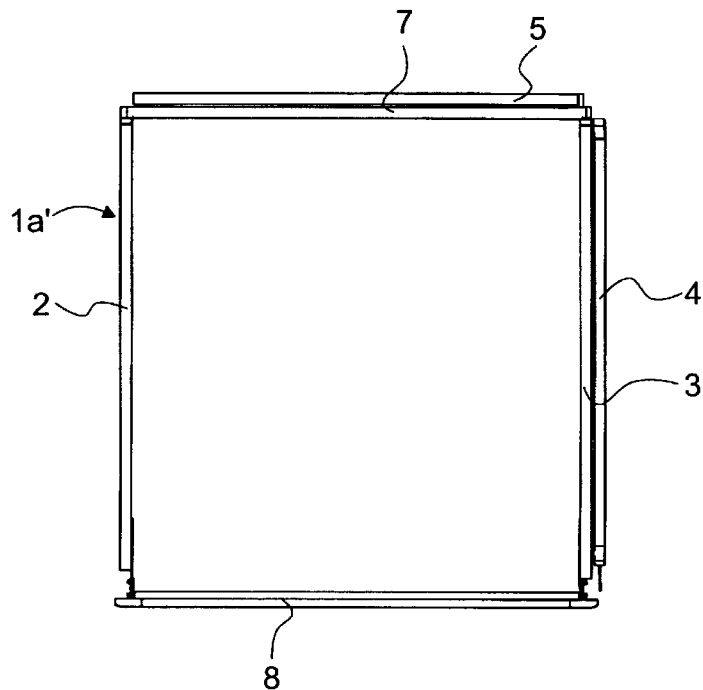
FIG. 6a–c: a schematic side view of the parallelogram-like collapsing of the freight container.
Figure 6B:
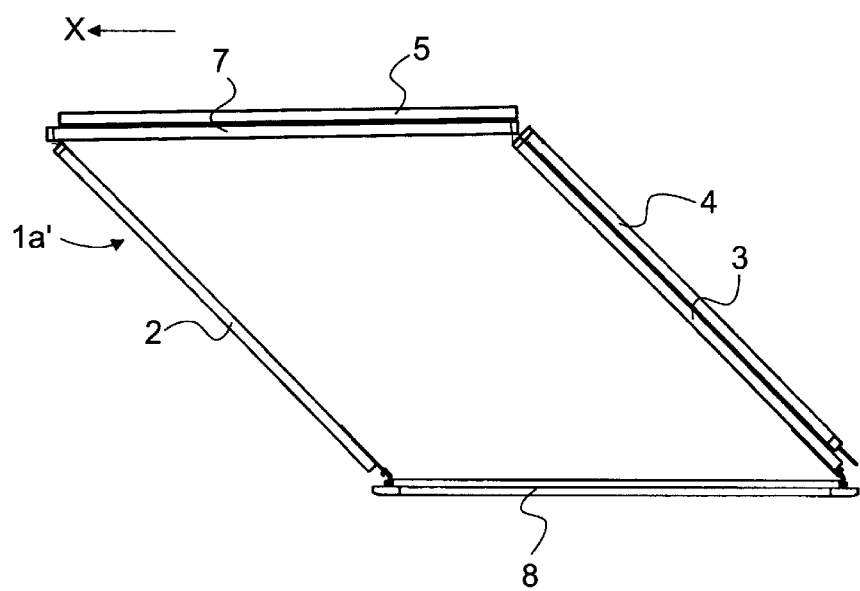
Figure 6C:
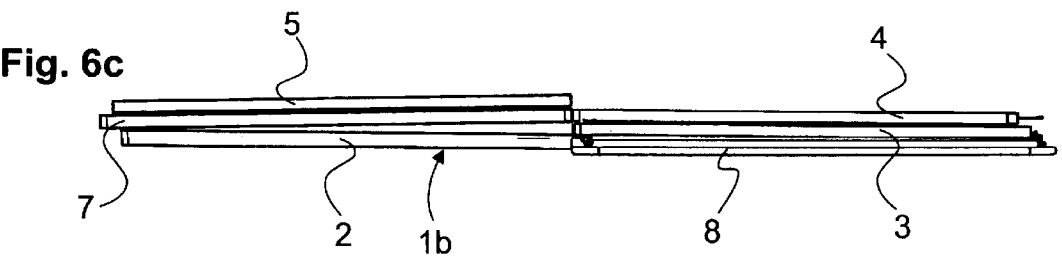

FIGS. 6a–c show the last step in collapsing the freight container from a side view and front view analogous to FIG. 2. The outer upper side frame 6 and the outer lower side frame 5 (not visible in this side view) have already been folded onto the roof frame 7 in a first step, and the inner side frame 4 has likewise been folded onto the rear frame 3 in a previous step. On subsequently folding the container 1a', or its frame structure, in a parallelogram-like manner in direction X a collapsed freight container 1b is obtained. On collapsing the structure the front frame 2 is laid next to the base element 8. On top, likewise side-by-side and displaced with respect to height are the roof frame 7 with the side frames 5, 6 folded onto it and the rear frame 3 with the inner side frame 4 folded over on top of it.

Figure 7A:
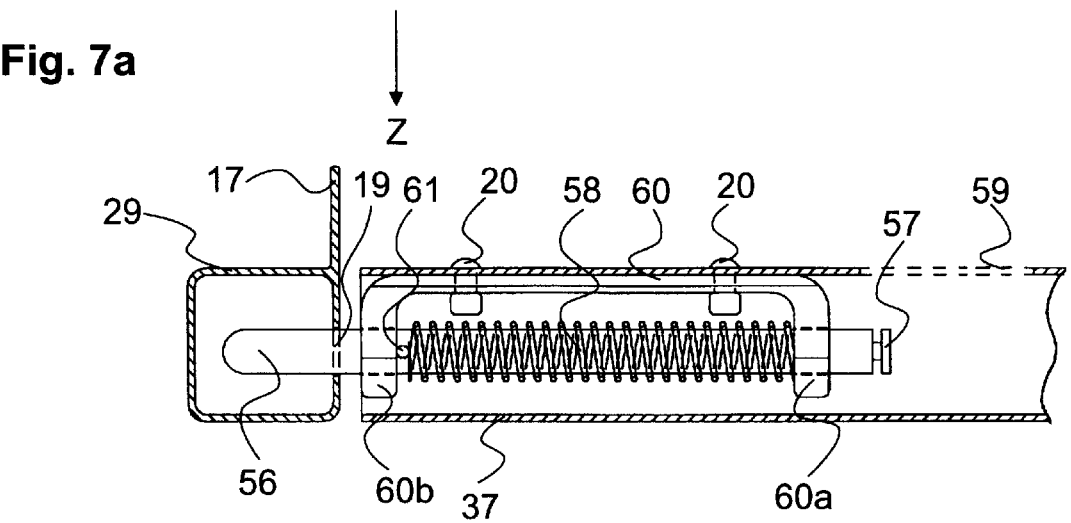
Figure 7B:
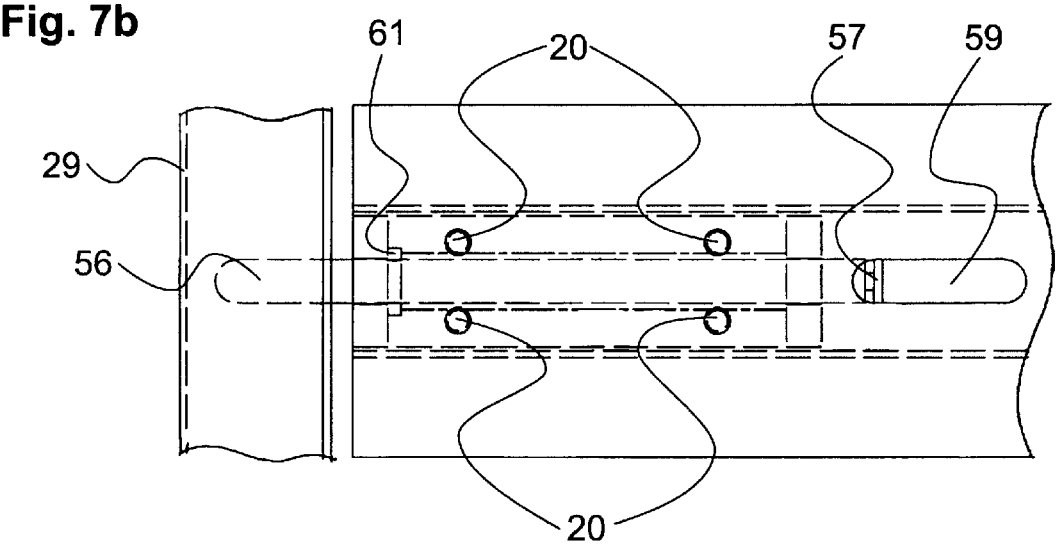

FIG. 7a shows the snap-shut closure or locking closure 10 which locks into place the inner side frame in the roof region and the front frame 2, here shown in cross-section along line E—E in FIG. 2a. A C-shaped support 60 is recessed into the top horizontal section 37 of the inner side frame 4 and is attached to the inside of the outside section wall by means of rivets 20. Both short flanges 60a, b of the support 60 are penetrated by a closure bolt 56 that is axially enclosed by a spiral spring 58 which at one end rests against the short flange 60a and at the other end is held by a pin 61 which penetrates the closure bolt 56. When no force is applied, the pin 61 lies against the lower short flange 60b and the end of the closure bolt 56 penetrates an opening 19 in the vertical inner section 29 of the front frame 2.

On drawing back the actuating element 57, which is accessed through the longitudinal hole 59 from the interior of the container, the closure bolt 56 is drawn back out of the opening 19 and at the same time the spiral spring compressed by drawing back the pin 61. The locking mechanism is released. To provide a locking action, the actuating element 57 is released causing the closure bolt 56 under the force of the spiral spring 58 to snap into the catch-opening 19.

The freight container of the example shown here has an overall height h of 150 cm to 160 cm, preferably 158 cm, an overall length b of 190 cm to 200 cm, preferably 198 cm, a base length a of 150 cm to 160 cm, preferably 156 cm (FIG. 5a), a base breadth c of 150 cm to 160 cm, preferably 153 cm and breadth d of 145 cm to 155 cm, preferably 150 cm (FIG. 2a).

What is claimed is:

1. A Collapsible, foldable freight container for air transport which, in the unfolded, operational position, has a stable shape and is self-supporting comprises:
    a frame structure provided on a base element, the base element having a plurality of longitudinal sides, the frame structure comprises
        a) a front frame having an upper and lower horizontal and an inner and outer vertical, longitudinal side,
        b) a rear frame which lies opposite and parallel to the front frame and having an upper and lower horizontal and inner and outer vertical, longitudinal side,
        c) an inner side frame having an upper and lower horizontal and a rear and front vertical, longitudinal side,
        d) an outer upper side frame which lies opposite and parallel to the inner side frame and having an upper and lower horizontal and a rear and front vertical, longitudinal side,
        e) an outer lower side frame having an upper and lower horizontal and a rear and front inclined, longitudinal side and which is bordering with its upper horizontal longitudinal side on the lower horizontal longitudinal side of the outer upper side frame, whereby the outer lower side frame is inclined towards the base to the interior of the container, and
        f) a roof frame which lies opposite and parallel to the base element and having a rear, a front, an inner and an outer horizontal longitudinal side;
    whereby the front, the rear and the outer side frames delimit a container balcony;
    a first hinge connection having a vertical axis of rotation for joining the rear vertical longitudinal side of the inner side frame to the inner vertical longitudinal side of the rear frame to allow the inner side frame to pivot from an operational position to the rear frame;
    second hinge connections having a horizontal axis of rotation for joining the outer lower side frame to the outer upper side frame on their abutting longitudinal sides and for joining the upper horizontal longitudinal side of the outer upper side frame to the outer horizontal longitudinal side of the roof frame in a manner which allows a rotation of the outer lower side frame into the plane of the outer upper side frame and which allows for rotating of the outer upper side frame together with the outer lower side frame onto the roof frame; and
    third hinge connections having a horizontal axis of rotation for joining each of the lower horizontal longitudinal sides of the rear frame and the front frame to first and second abutting horizontal longitudinal sides of the base element and for joining each of the upper horizontal longitudinal sides of the rear frame and the front frame to horizontal longitudinal sides of the roof frame in a manner which allows for rotation of the rear frame and the front frame about the horizontal axis in a parallelogram-like manner between an operational position and a folded position; and
    releasable connections for creating a rigid, releasable connection between the side frames and at least one of the front frame, rear frame, roof frame and base element.

2. A collapsible freight container for air transport, according to claim 1, wherein the rear frame has a front surface and a back surface, and wherein the first hinge connection allows the inner side frame to pivot to the back surface of the rear frame.

3. A collapsible freight container for air transport, according to claim 1 wherein the releasable connections are provided on the side frames and at least one of the front frame, rear frame, roof frame and base element.

4. A collapsible freight container for air transport, according to claim 1 wherein the front frame, rear frame, inner side frame, upper and lower outer side frames and roof frame contain sections and are provided at least in part with wall cladding and the longitudinal sides of the front frame, rear frame, inner side frame, upper and lower outer side frames and roof frame are delimited at least in part by the sections.

5. A collapsible freight container for air transport according to claim 1 wherein the inner side frame and the rear frame have vertical sections and are joined together at their vertical sections in a manner allowing rotation, by the second hinge connections which have vertical axis of rotation, and the inner side frame and the front frame which has vertical sections are joined together at their vertical sections in a rigid manner by locking devices, and the outer lower side frame is joined at its lower longitudinal side to one of the base element, the rear frame and the front frame in a rigid manner by means of a further locking device, and the outer upper side frame is joined at its lower longitudinal side and the outer lower side frame is joined at its upper longitudinal side, to the rear and front frame respectively, by means of a locking device.

6. A collapsible freight container for air transport, according to claim 5 wherein the inner side frame and the front frame are joined together by locking devices mounted at an edge on the horizontal upper and lower longitudinal sides of the inner side frame, and the outer lower side frame is locked by locking devices to the rear frame and front frame, and the outer upper side frame is locked to the rear frame and front frame by locking devices mounted on an edge of its upper and lower longitudinal sides.

7. A collapsible freight container for transport, according to claim 6 wherein the second hinge connections are strap hinges extending essentially over the whole horizontal longitudinal sides of the outer upper side frame and the third hinge connections are hinges mounted on the front and rear frames at the lower horizontal longitudinal sides thereof.

8. A collapsible freight container for air transport, according to claim 6 wherein the locking devices are snap-shut closures with spring-loaded locking bolts, and the snap-shut closures are recessed into frame sections, and the locking bolt in the engaged state passes through an opening in a wall of the frame section.

9. A collapsible freight container for air transport, according to claim 1 wherein the frame structure is provided in the front frame with an opening for loading.

10. A collapsible freight container for air transport, according to claim 9 wherein the opening for loading has a foldable flexible door with horizontal closure belts and, when the door is closed, has closure belts for the flexible door.

11. A collapsible freight container for air transport, according to claim 6 wherein the locking devices can be opened only from the interior of the freight container.

12. A process for folding a collapsible freight container according to claim 6, comprising the steps of:

opening the locking devices joining the inner side frame to the front frame; tilting the inner side frame about a vertical axis of rotation of the first hinge connection which joins together the inner side frame and the rear frame; opening locking devices locking the outer lower and outer upper side frames to the outer sections of the front and rear frames and to the base element; tilting the outer lower side frame into the plane of the outer upper side frame about the horizontal axis of rotation of the second hinge connection which joins together the outer lower and outer upper side frames; tilting the outer lower side frame together with the outer upper side frame about the horizontal axis of rotation of the second hinge connection which joins together the outer upper side frame and the roof frame; and folding the freight container together in a parallelogram-like manner about the horizontal axis of rotation of the third hinge connections which join together the base element and the roof frame to the front and rear frames respectively.

13. A collapsible freight container for air transport, according to claim 1 wherein a first cable reinforcement is positioned between the roof frame and the front frame, whereby one end of the first reinforcement is attached to an inner section of the roof frame and another end is attached to an inner section of the front frame, and wherein a second cable reinforcement is positioned between the rear frame and the front frame, whereby one end of the second reinforcement is attached to an outer section of the rear frame and another end of the reinforcement is attached to an outer section of the front frame.

* * * * *